(12) United States Patent
Wei (10) Patent No.: US 10,474,155 B2
(45) Date of Patent: Nov. 12, 2019

(54) SYSTEM AND METHOD FOR MATERIAL DISPOSAL

(71) Applicant: Caterpillar Inc., Peoria, IL (US)

(72) Inventor: Mo Wei, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 206 days.

(21) Appl. No.: 15/663,207

(22) Filed: Jul. 28, 2017

(65) Prior Publication Data

US 2019/0033877 A1  Jan. 31, 2019

(51) Int. Cl.
  *G05D 1/02* (2006.01)
  *E02F 9/20* (2006.01)
  *G05D 1/00* (2006.01)

(52) U.S. Cl.
  CPC ............. *G05D 1/0217* (2013.01); *E02F 9/20* (2013.01); *G05D 1/0005* (2013.01); *G05D 1/0221* (2013.01); *G05D 1/0223* (2013.01); *G05D 1/0287* (2013.01); *G05D 2201/0202* (2013.01)

(58) Field of Classification Search
  USPC .......................................................... 701/23
  See application file for complete search history.

(56) References Cited

U.S. PATENT DOCUMENTS

| | | | | |
|---|---|---|---|---|
| 7,079,943 B2* | 7/2006 | Flann | ................... | A01B 69/008 701/423 |
| 8,386,110 B2* | 2/2013 | Maekawa | ............ | G05D 1/0217 180/168 |
| 2004/0158355 A1* | 8/2004 | Holmqvist | ........... | G05D 1/0236 700/245 |
| 2008/0269981 A1* | 10/2008 | Pagnotta | ............... | E02F 9/2045 701/33.4 |
| 2009/0216410 A1* | 8/2009 | Allen | .................... | G05D 1/0238 701/50 |
| 2011/0288769 A1* | 11/2011 | Gudat | .................. | G06Q 10/047 701/532 |
| 2012/0136508 A1* | 5/2012 | Taylor | .................... | E02F 9/2045 701/2 |
| 2013/0035978 A1* | 2/2013 | Richardson | .......... | G06Q 10/087 705/7.27 |
| 2013/0054080 A1* | 2/2013 | Jacobson | ........... | G07C 9/00039 701/29.3 |
| 2014/0156162 A1* | 6/2014 | Faivre | ............... | B60W 50/0098 701/84 |
| 2014/0163779 A1* | 6/2014 | Braunstein | ............. | G05D 1/021 701/2 |

(Continued)

*Primary Examiner* — Tyler D Paige
(74) *Attorney, Agent, or Firm* — L. Glenn Waterfield (57) ABSTRACT

A control system for operating an autonomous earthmoving machine to move material from a work area to a dumping location is disclosed. The control system includes a receiving module to receive values of a set of parameters associated with a profile of a first ground surface between the work area and the first dump location, a profile of a second ground surface between the work area and the second dump location, and operational characteristics of the machine. The control system includes a controller to generate a first cost and a second cost of moving the material from the work area to the first dump location and the second dump location, respectively, and send instructions to the autonomous earthmoving machine to move the material from the work area to either of the first dump location and the second dump location, based on the first cost and the second cost.

20 Claims, 6 Drawing Sheets

(56) References Cited

U.S. PATENT DOCUMENTS

| | | | |
|---|---|---|---|
| 2015/0046052 A1* | 2/2015 | Jensen | B60T 8/1701 |
| | | | 701/70 |
| 2015/0240453 A1* | 8/2015 | Jaliwala | E02F 9/2041 |
| | | | 701/50 |
| 2015/0354169 A1* | 12/2015 | Wei | E02F 9/205 |
| | | | 701/50 |
| 2016/0040388 A1* | 2/2016 | Kontz | E02F 3/84 |
| | | | 701/50 |
| 2016/0040397 A1* | 2/2016 | Kontz | E02F 9/262 |
| | | | 701/400 |
| 2016/0069045 A1* | 3/2016 | Wei | E02F 9/2025 |
| | | | 701/50 |
| 2016/0201298 A1* | 7/2016 | Taylor | E02F 9/262 |
| | | | 701/50 |
| 2016/0348337 A1* | 12/2016 | Colwell | E02F 3/46 |
| 2019/0033877 A1* | 1/2019 | Wei | G05D 1/0217 |
| 2019/0056743 A1* | 2/2019 | Alesiani | G05D 1/0217 |

\* cited by examiner

SYSTEM AND METHOD FOR MATERIAL DISPOSAL

TECHNICAL FIELD

The current disclosure relates to earthmoving operations, and more particularly to a machine, a system, and a method for material disposal at a worksite.

BACKGROUND

Heavy machines, such as dozers, operate at various worksites for performing earthmoving operations. Such machines may be autonomously operated by establishing a communication with a central station and therefore, do not need a human intervention for operation while following fixed haulage routes. In mining operations, such machines remove multiple layers of earthen material from a work area before extracting mining material. For example, in case of coal mining, coal is extracted after removing overburden placed above and around a coal reserve. The overburden is the combination of rock, soil, and ecosystem that is formed around the coal reserve. Generally, in order to be in conformance with environmental regulations, the overburden has to be re-settled in the original location after the mining material is extracted. Therefore, it is relevant to ensure that the overburden is handled appropriately for successfully performing mining operations.

A machine may dispose the overburden by performing a back-stacking operation in which the machine disposes the overburden in form of piles at a disposal site. In the current technique, the machine travels to a point of a dumping location that is at a farthest distance to the work area, and form a first pile of the material. Further, a second pile is formed at a point just before the farthest point. Therefore, a distance between the work area and the first pile formed will be greater than a distance between the work area and the last pile formed. Another technique to dispose the overburden involves forming the first pile at a point of the dumping location that is at a shortest distance with respect to the work area. The second pile is then formed at a point just after the first pile. In the current technique, a distance between the work area and the first pile formed is shorter than a distance between the work area and the last pile formed. Both the techniques demand different level of performance from the machine, considering different ground profiles of the worksite to be travelled by the machine in both the techniques. However, there is a lack of objective approach to select one of the abovementioned techniques for disposing off of the overburden.

SUMMARY OF THE DISCLOSURE

In an aspect of the current disclosure, a control system for operating an autonomous earthmoving machine to move material from a work area to either of a first dump location and a second dump location based on cost is provided. The control system includes a position determining module configured to determine a pose of the autonomous earthmoving machine, based on details associated with a position and an orientation of the autonomous earthmoving machine. The control system includes a receiving module configured to receive values of a set of parameters associated with a profile of a first ground surface between the work area and the first dump location, a profile of a second ground surface between the work area and the second dump location, and operational characteristics of the machine. The control system also includes a controller in communication with the position determining module and the receiving module. The controller is configured to receive the pose of the autonomous earthmoving machine from the position determining module. Further, the controller is configured to generate a first cost of moving the material from the work area to the first dump location, based at least in part on the profile of the first ground surface. The first ground surface includes an inclined surface and a flat surface extending from the inclined surface. The controller is further configured to generate a second cost of moving the material from the work area to the second dump location based at least in part on the profile of the second ground surface and a compensating factor. The second ground surface includes an inclined surface and an elevated surface extending from the inclined surface. The compensating factor is determined based on the operational characteristics of the autonomous earthmoving machine while moving the material along the elevated surface. Based on the first cost and the second cost, the controller is configured to send instructions to the autonomous earthmoving machine to move the material from the work area to either of the first dump location and the second dump location.

In another aspect of the current disclosure, a method of operating an autonomous earthmoving machine to move material from a work area to either of a first dump location and a second dump location based on cost is provided. The method includes determining a pose of the autonomous earthmoving machine, based on details associated with a position and an orientation of the autonomous earthmoving machine. The method further includes receiving values of a set of parameters associated with a profile of a first ground surface between the work area and the first dump location, a profile of a second ground surface between the work area and the second dump location, and operational characteristics of the autonomous earthmoving machine. The method further includes generating a first cost of moving the material from the work area to the first dump location, based at least in part on the profile of the first ground surface. The first ground surface includes an inclined surface and a flat surface extending from the inclined surface. The method further includes generating a second cost of moving the material from the work area to the second dump location based at least in part on the profile of the second ground surface and a compensating factor. The second ground surface includes an inclined surface and an elevated surface extending from the inclined surface. The compensating factor is determined based on the operational characteristics of the autonomous earthmoving machine while moving the material along the elevated surface. The method further includes sending instructions to the autonomous earthmoving machine to move the material from the work area to either of the first dump location and the second dump location, based on the first cost and the second cost.

In yet another aspect of the current disclosure, an autonomous earthmoving machine is provided. The autonomous earthmoving machine includes a ground engaging work implement for engaging ground surfaces of a work area. The autonomous earthmoving machine further includes a control system for operating the autonomous earthmoving machine to move the material, by using the ground engaging work implement, from the work area to either of a first dump location and a second dump location. The control system is configured to determine a pose of the autonomous earthmoving machine based on details associated with a position and an orientation of the autonomous earthmoving machine, and receive values of a set of parameters associated with a profile of a first ground surface between the work area and the first dump location, a profile of a second ground surface between the work area and the second dump location, and operational characteristics of the autonomous earthmoving machine. The control system is further configured to generate a first cost of moving the material from the work area to the first dump location, based at least in part on the profile of the first ground surface. The first ground surface includes an inclined surface and a flat surface extending from the inclined surface. Further, the control system is configured to generate a second cost of moving the material from the work area to the second dump location based at least in part on the profile of the second ground surface and a compensating factor. The second ground surface includes an inclined surface and an elevated surface extending from the inclined surface. The compensating factor is determined based on the operational characteristics of the autonomous earthmoving machine while moving the material along the elevated surface. The control system is further configured to control the autonomous earthmoving machine to move the material from the work area to the first dump location or the second dump location, based on the first cost and the second cost.

Other features and aspects of this disclosure will be apparent from the following description and the accompanying drawings.

DETAILED DESCRIPTION

Figure 1:
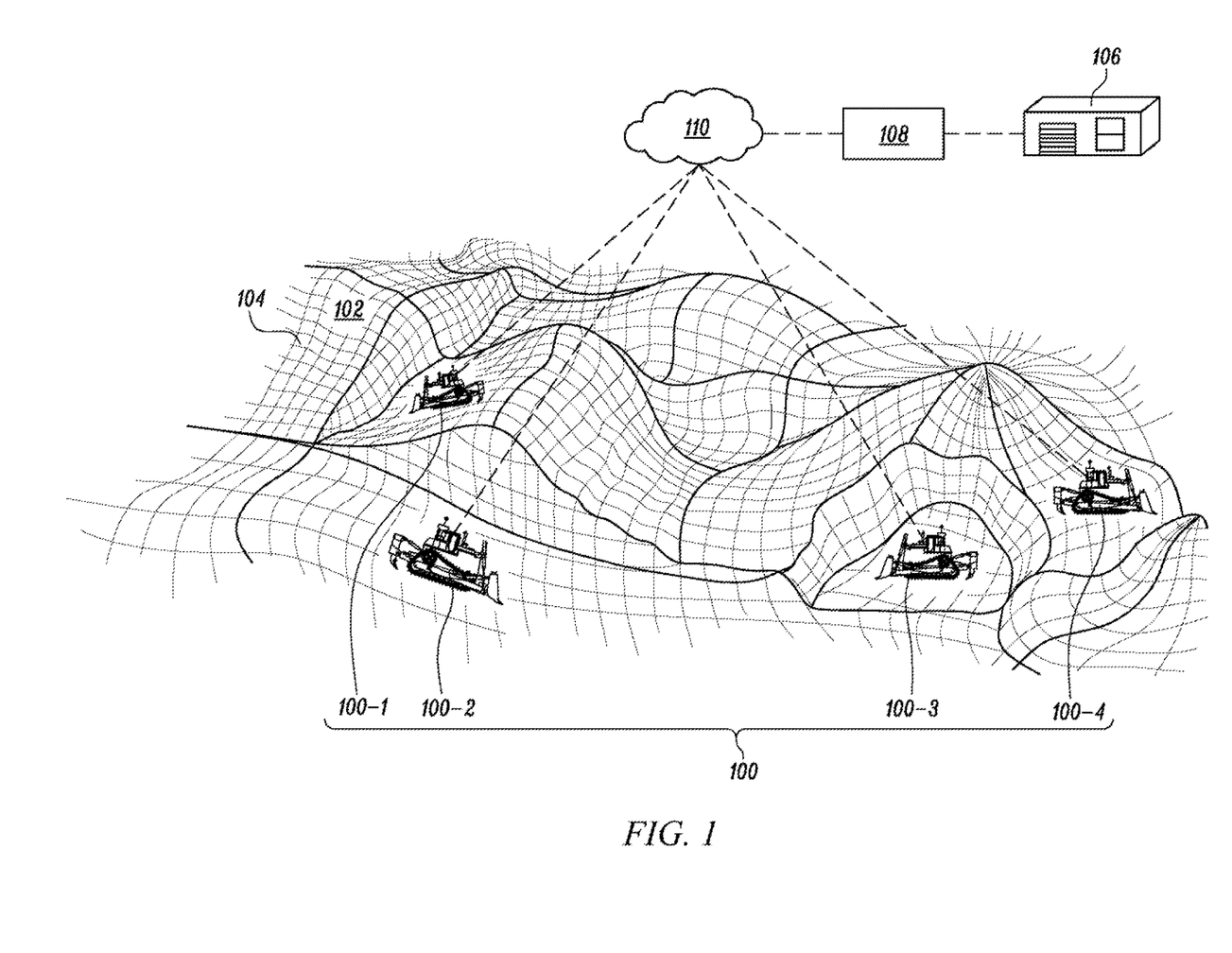
FIG. 1 illustrates a schematic view of a worksite where autonomous earthmoving machines are operating, according to an aspect of the current disclosure.

FIG. 1 illustrates a schematic view of a plurality of autonomous earthmoving machines 100 operating at a worksite 102, according to an aspect of the current disclosure. In an aspect, the worksite 102 may include, but is not limited to, a mining site and a construction site. The plurality of autonomous earthmoving machines 100 may interchangeably be referred to as machines 100. Further, the machines 100 may individually be referred to as machine 100 or machine 100-1, machine 100-2, machine 100-3, and machine 100-4, without departing from the scope of the current disclosure. In an aspect, the machine 100 may be an autonomous vehicle. An autonomous vehicle may be understood as a driverless vehicle or a self-driving vehicle which may be capable of navigating based on environmental factors, and without a human input. In an aspect, the machines 100 may include, but are not limited to, articulating trucks, dozers, loaders, and dump trucks that may have the functionality of moving material from one location to another location at the worksite 102. The constructional and operational features of the machine 100 are explained in detail in the description of FIG. 2.

In an aspect, the machines 100 may be operated autonomously, or semi-autonomously. In case of autonomous operation, the machines 100 may receive instructions from a central monitoring station 106, and operate accordingly. In case of semi-autonomous operation, the machines 100 may be operated by a remote control (not shown) and/or by an operator from a remote location (not shown).

In an aspect, the machines 100 may be travelling on predefined routes for performing operations at the worksite 102. For example, in case of the worksite 102 being the mining site, the machines 100, such as dozers, usually follow predetermined paths from a digging location to a dumping location. The predefined routes may be generated based on various factors, which may include, but are not limited to, operations to be performed at the worksite 102, a sequence of the operations, and availability of the machines 100.

In an aspect, a control system 108 may transmit instructions to operate the machine 100 for moving the material from a work area to a dumping location based on cost. In an aspect, the control system 108 may receive values of a set of parameters associated with the worksite 102 and operational characteristics of the machine 100, and operate the machine 100 to dump the material based on the set of parameters. In an aspect, the control system 108 may be implemented onboard the machine 100. In another aspect, the control system 108 may be implemented off-board the machine 100. In an aspect, the control system 108 may be embodied in the central monitoring station 106, proximally or remotely located from the worksite 102. The constructional and operational features of the control system 108 are explained in detail in the description of FIG. 3, FIG. 4, and FIG. 5.

In an aspect, the machine 100 may be in communication with the control system 108 and the central monitoring station 106 through a network 110. The network 110 may be a wireless network 110 and/or a wired network 110. The machines 100 may also be in communication with each other through the network 110.

Figure 2:
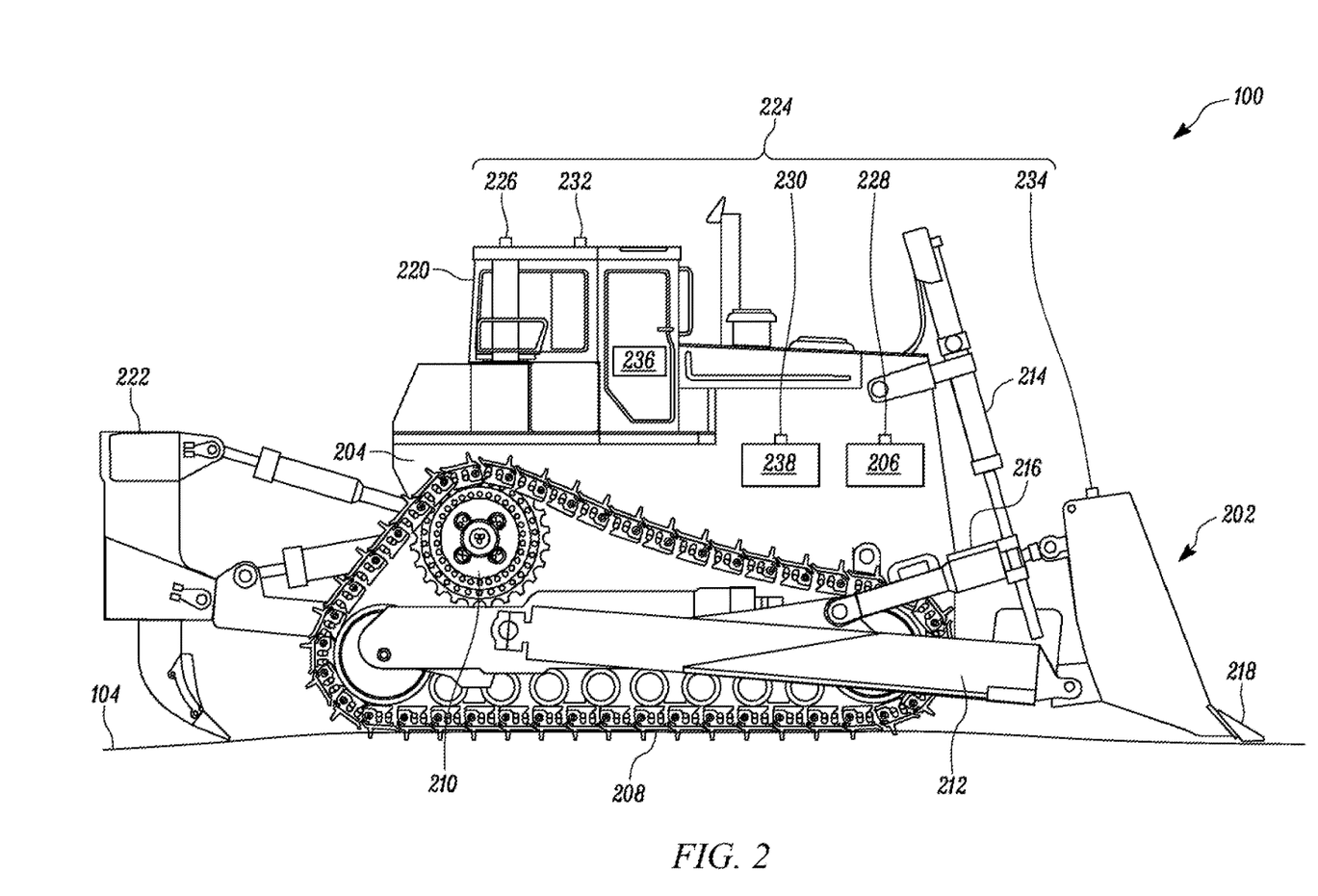
FIG. 2 illustrates a schematic side view of an autonomous earthmoving machine illustrated as a dozer, according to an aspect of the current disclosure.

FIG. 2 illustrates the machine 100 as a dozer equipped with a ground engaging work implement 202 for engaging a ground surface 104 at the worksite 100 and for pushing the material from one location to the other, according to an aspect of the current disclosure. In an aspect, the ground engaging work implement 202, interchangeably referred to as work implement 202, may be a blade. The machine 100 may also include a tool 222 for performing the earthmoving operations.

The machine 102 may include a frame 204 and an engine 206 supported on the frame 204. Ground-engaging members, such as tracks 208, may be provided on the frame 204 to propel the machine 100. The engine 206 and a transmission unit 238 may operatively be connected to drive sprockets 210, which drive the tracks 208.

The work implement 202 may be pivotably connected to the frame 204 by arms 212. The machine 100 may also include a first hydraulic cylinder 214 coupled to the frame 204, which may support the work implement 202 and allow the work implement 202 to move up or down. Further, a second hydraulic cylinder 216 may allow angular movement of a tip 218 of the work implement 202 with respect to the arms 212 of the machine 100.

Further, the machine 100 may include an operator cabin 220 having multiple input devices to receive commands from the control system 108 to control a propulsion system (not shown) of the machine 100 and operate the work implement 202 associated with the machine 100. The operator cabin 220 may include a dashboard (not shown) having an odometer, a tachometer, and a speedometer. The machine 100 may also include an Electronic Control Unit (ECU) 236 that may be in communication with all the components of the machine 100, such as the odometer, the tachometer, and the speedometer.

In an aspect, the machine 100 may be equipped with a set of sensors 224 that provides data indicative of various operational and functional characteristics of the machine 100 and/or of operating environment of the machine 100. The set of sensors 224 may be in communication with the control system 108. In an aspect, the set of sensors 224 may include, but is not limited to, a position detection sensor 226, an engine speed sensor 228, a torque converter speed sensor 230, a terrain detection sensor 232, and an implement load sensor 234. In an aspect, the position detection sensor 226, the engine speed sensor 228, the torque converter speed sensor 230, the terrain detection sensor 232, and the implement load sensor 234 may be in communication with each other, and may operate in conjunction with each other.

The position detection sensor 226 may detect values associated with a position and an orientation of the machine 100 relative to the ground surface 104 of the worksite 102. In an aspect, the position detection sensor 226 may further include a number of sensors. For example, the position detection sensor 226 may include a slope sensor, such as a pitch angle sensor for detecting the slope of the machine 100 with respect to the ground surface 104. In another example, the position detection sensor 226 may include a perception based sensor which may use Light Amplification by Stimulated Emission of Radiation (LASER), Radio Detection and Ranging (RADAR), and Sound Navigation and Ranging (SONAR) to detect various parameters associated with positioning of the machine 100.

In an aspect, the position detection sensor 226 may be one of a Global Positioning System (GPS) and a Global Navigation Satellite System (GNSS) having an Inertial Measurement Unit (IMU). Further, the position detection sensor 226 may detect values associated with the position and the orientation of the machine 100 with respect to a coordinate system, such as an earth coordinate system or a worksite coordinate system.

Further, the engine speed sensor 228 and the torque converter speed sensor 230 may detect operating conditions of the engine 206 and a drive train (not shown). In particular, the engine speed sensor 228 may detect a speed or an output of the engine 206. Further, the torque converter speed sensor 230 may detect an output speed of a torque converter (not shown). When the material is being moved by the work implement 202, the engine output speed and the torque converter output speed may be about equal.

Further, the terrain detection sensor 232 may detect the terrain of the worksite 102. In an aspect, the terrain detection sensor 232 may detect a crest (not shown) at the worksite 102 based on changes detected in the terrain of the ground surface 104 of the worksite 102. In an aspect, the terrain detection sensor 232 may include a pitch angle sensor for detecting a pitch angle. When the machine 100 may be travelling on an uphill route, the control system 108 may determine a change in the pitch angle based on the detection by the pitch angle sensor. In an aspect, the terrain detection sensor 232 may be a perception based sensor to detect a physical location of the crest or other similar surfaces at the worksite 102. The perception based sensor may use the RADAR, the SONAR, Light Detection and Ranging (LIDAR), a camera, and/or a drone for detecting the physical location.

In an aspect, the implement load sensor 234 may detect load on the work implement 202. In an aspect, the work implement 202 may move the material over the crest and therefore, the load on the work implement 202 may be reduced. In such an aspect, the implement load sensor 234 may detect the reduction in the load on the work implement 202. Further, the terrain detection sensor 232 may detect a change in the terrain due to the presence of the crest, based on the reduction in the load on the work implement 202. Therefore, the implement load sensor 234 and the terrain detection sensor 232 may operate in conjunction with each other to detect the reduction in the load and the presence of the crest, respectively. In another aspect, an increase in the load on the work implement 202 may be indicative of an inclination or the machine 100 moving over a pile of the material.

In an aspect, the implement load sensor 234 may include pressure sensors for detecting pressure in the second hydraulic cylinder 216 coupled to the work implement 202. A decrease in pressure within the second hydraulic cylinder 216 may indicate a decrease in the load on the work implement 202, for example, due to the material being pushed over the crest. In an aspect, the implement load sensor 234 may include an acceleration sensor, for example, a three-axis accelerometer for detecting an acceleration of the machine 100. For example, upon moving the material past the crest, the machine 100 may accelerate due to a reduction in the load on the work implement 202. On the other hand, a deceleration of the machine 100 may be indicative of an uphill travel of the machine 100.

Figure 3:
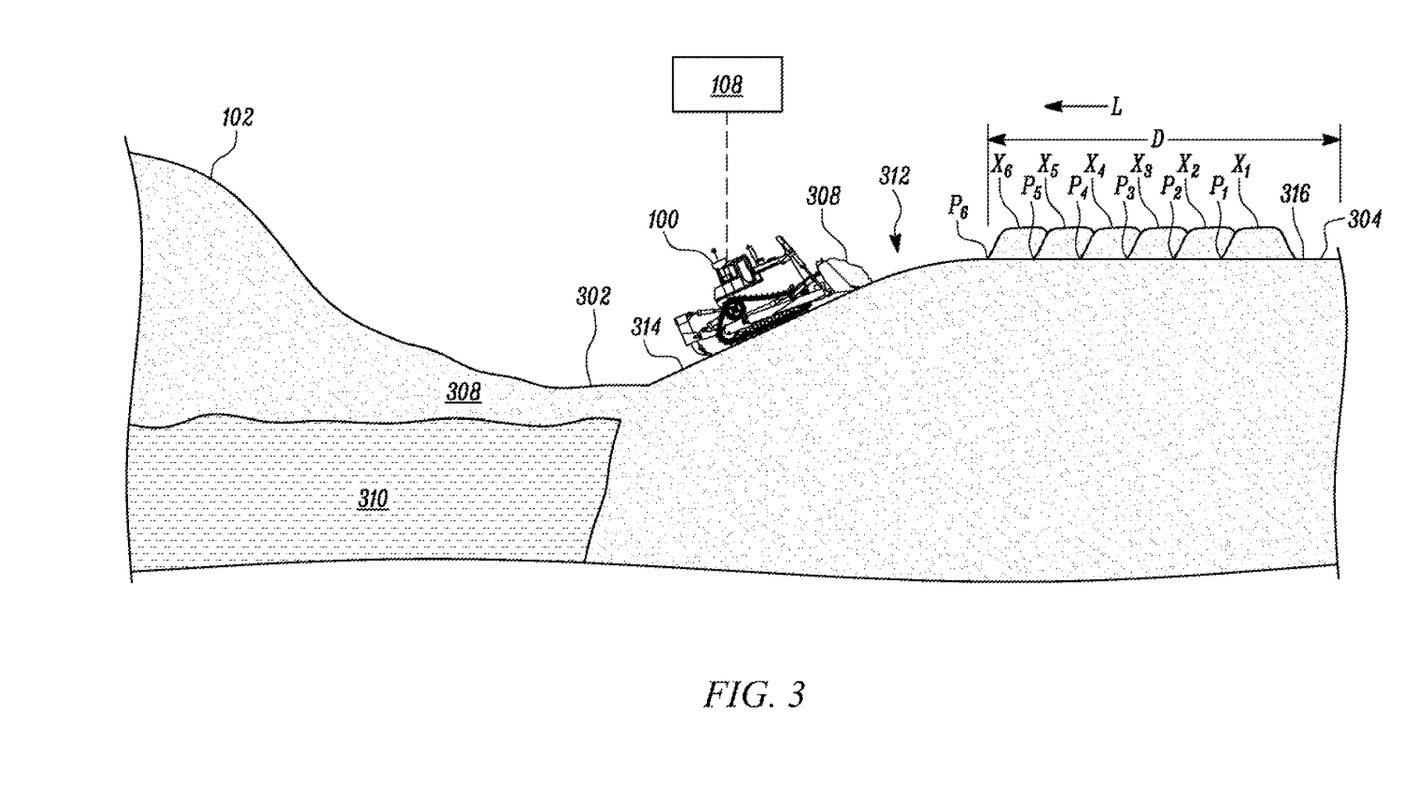
FIG. 3 illustrates the autonomous earthmoving machine in communication with a control system for moving material from a work area to a first dump location, according to an aspect of the current disclosure.
Figure 4:
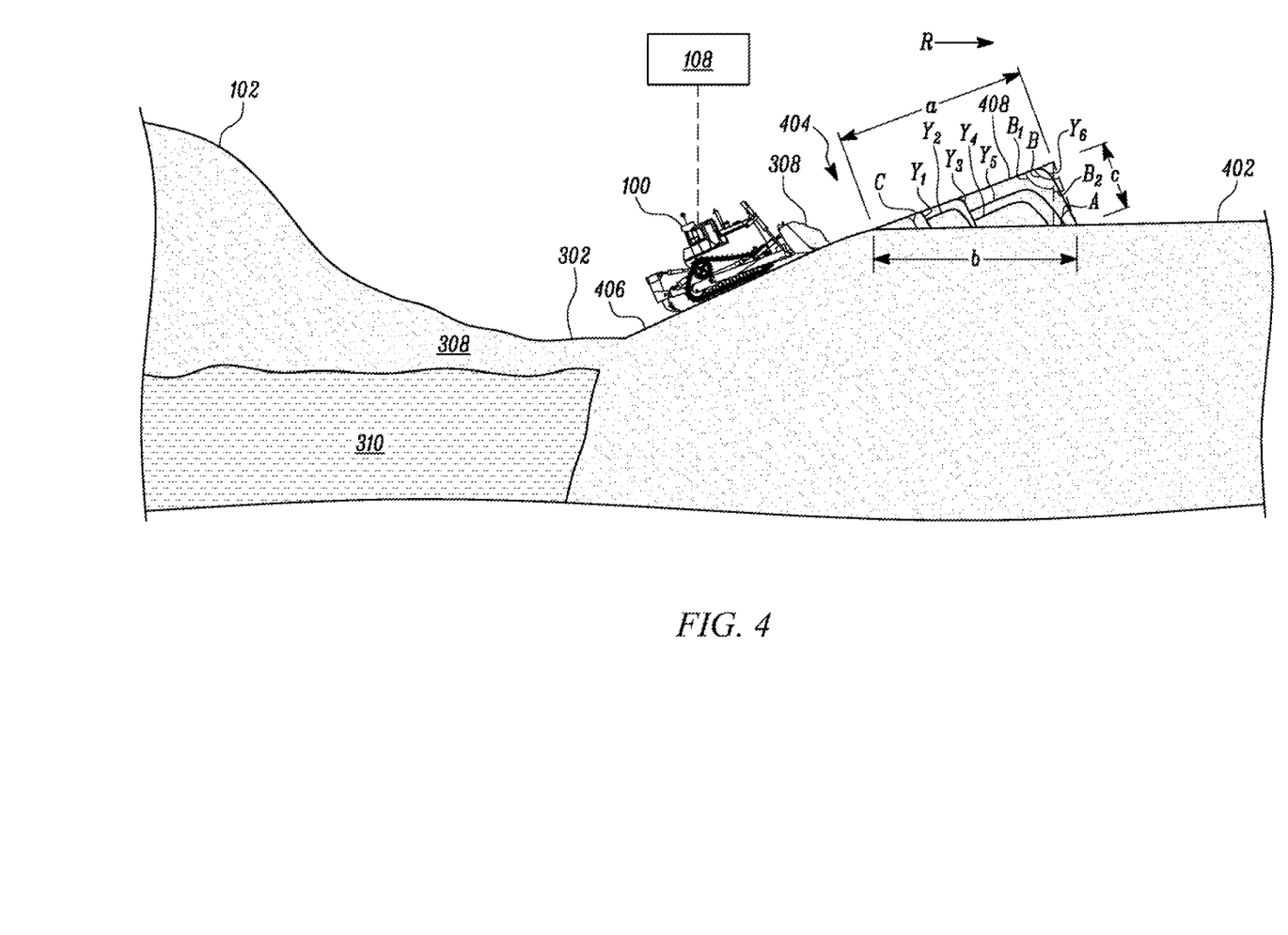
FIG. 4 illustrates the autonomous earthmoving machine in communication with the control system for moving the material from the work area to a second dump location, according to an aspect of the current disclosure.

FIG. 3 and FIG. 4 illustrate the machine 100 in communication with the control system 108 for moving the material from a work area 302 to a first dump location 304 and a second dump location 402, respectively, based on the cost, according to an aspect of the current disclosure. Referring to FIG. 3 and FIG. 4, the work area 302 may include a layer of overburden 308, i.e., rock, soil, and ecosystem lying on top of a coal reserve 310. The top layer of overburden 308 may hereinafter interchangeably be referred to as the overburden 308 or the top layer 308 or the material 308. In the current aspect, the operations of the machine 100 and the control system 108 are explained with regard to movement of the overburden 308 lying over the coal reserve 310 from the work area 302 to the first dump location 304 and the second dump location 402. A person skilled in the art would appreciate that the operations of the machine 100 and the control system 108 of the current disclosure are equally applicable for movement of any material from one location to another, without departing from the scope of the current disclosure.

Referring to FIG. 3, the machine 100 may travel on a first ground surface 312 to move the material 308 from the work area 302 to the first dump location 304. The first ground surface 312 may include an inclined surface 314 and a flat surface 316 extending from the inclined surface 314. In an aspect, the machine 100 may dispose the material 308 at the flat surface 316 of the first dump location 304 in form of equally sized piles.

For moving a first batch of the material 308 from the work area 302, the machine 100 may travel to a location "P₁" of the flat surface 316 that is farthest from the work area 302, and form a first pile "$X_1$" of the material 308. Subsequently, the machine 100 may dispose the next batch of the material 308 in form of a second pile "$X_2$" at a location "$P_2$" on the flat surface 316 that is right before the first pile "$X_1$" formed at the farthest location "$P_1$". The subsequent batches of the material 308 may be disposed at the flat surface 316 in similar manner to form a third pile "$X_3$" at a location "$P_3$", a fourth pile "$X_4$" at a location "$P_4$", a fifth pile "$X_5$" at a location "$P_5$", and a sixth pile "$X_6$" at a location "$P_6$". Therefore, the machine 100 may form the piles of the material 308 on the flat surface 316 in a direction moving from right to left as indicated by an arrow "L". The process of movement of the material 308 from the work area 302 to the first dump location 304 in the manner as explained may be referred to as a back-stacking process.

Referring to FIG. 4, the machine 100 may travel on a second ground surface 404 to move the material 308 from the work area 302 to the second dump location 402. The second ground surface 404 may include an inclined surface 406 and an elevated surface 408 extending from the inclined surface 406. The inclined surface 406 of the second ground surface 404 may be equivalent to the inclined surface 314 of the first ground surface 312. The elevated surface 408 of the second ground surface 404 may be formed as the machine 100 begins to dispose the material 308. The machine 100 may form the elevated surface 408 by stacking piles of the material 308 over one another.

The machine 100 may carry the material 308 from the work area 302, travel to the end of the inclined surface 406, and form a first pile $Y_1$ of the material 308 at the end of the inclined surface 406 and therefore, begin the formation of the elevated surface 408. In an aspect, for disposing a subsequent batch of the material 308, the machine 100 may travel over the first pile $Y_1$ and then form a second pile $Y_2$. Further, for disposing a third batch of the material 308, the machine 100 may form a third pile $Y_3$ above the second pile $Y_2$. Therefore, the machine 100 may increase height of the elevated surface 408 by stacking the third pile $Y_3$ over the second pile $Y_2$. For disposing a fourth batch of the material 308, the machine 100 may travel over the stack formed by the second pile $Y_2$ and the third pile $Y_3$, and form a fourth pile $Y_4$. Further, the machine 100 may form a fifth pile $Y_5$ and a sixth pile $Y_6$ above the fourth pile $Y_4$. Therefore, the machine 100 may keep forming the elevated surface 408 with increasing the height. As would be gathered, the batches of the material 308 are disposed in a direction from left to right to form the elevated surface 408, as illustrated by an arrow R. The process of movement of the material 308 from the work area 302 to the second dump location 402 in the manner as explained may be referred to as a push-to-edge process or a forward-stacking process.

The control system 108 in communication with the machine 100 may determine one of the back-stacking process and the forward-stacking process to be performed by the machine 100 for disposing the material 308 based on the cost to be incurred for execution of the back-stacking process and the forward-stacking process. In particular, the control system 108 may operate the machine 100 to move the material 308 from the work area 302 to either of the first dump location 304 and the second dump location 402, based on the cost.

Figure 5:
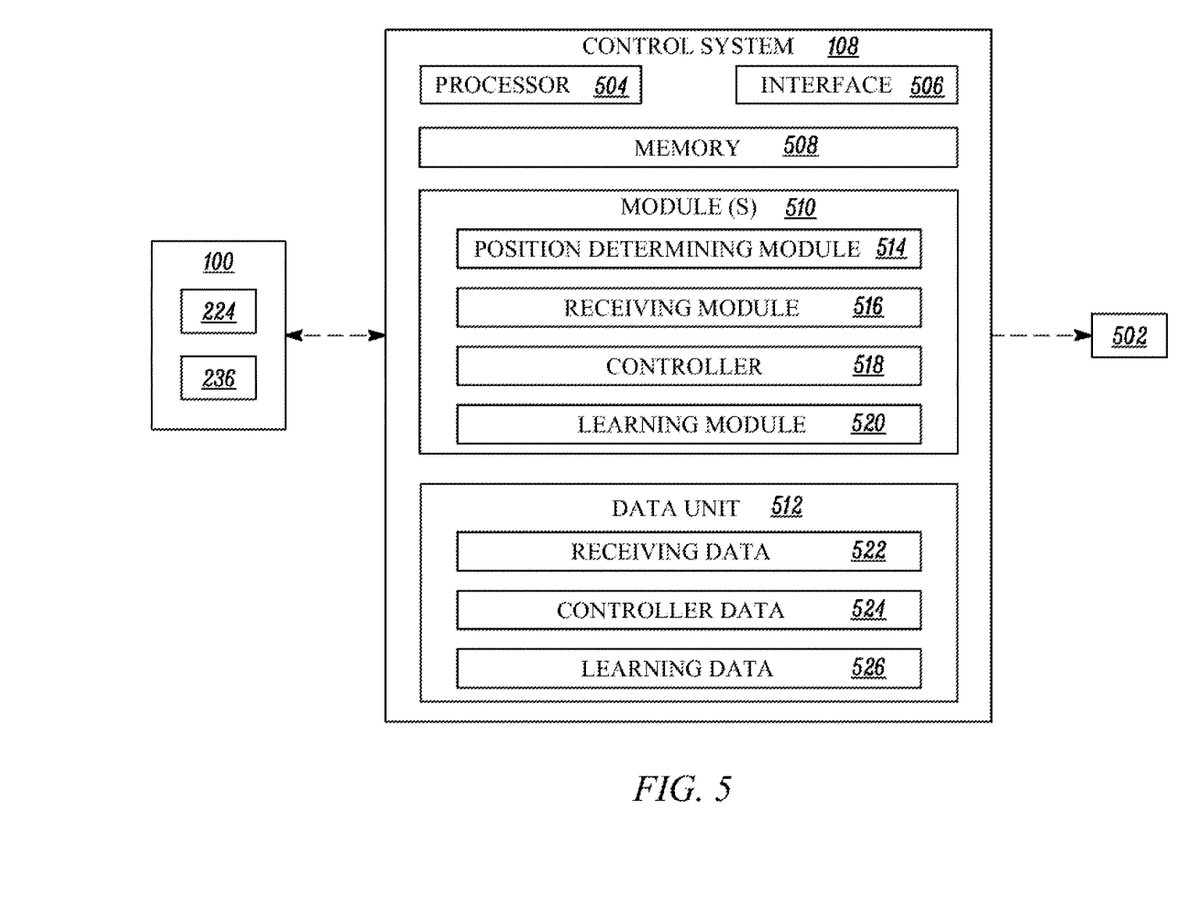
FIG. 5 illustrates a schematic block diagram of the control system in communication with a set of sensors and an output device, according to an aspect of the current disclosure.

FIG. 5 illustrates a block diagram of the control system 108 in communication with the set of sensors 224 and an output device 502, according to an aspect of the current disclosure. The output device 502 may include, but is not limited to, an audio-video device installed in the operator cabin 220 or the central monitoring station 106, a smart phone, a tablet, and a laptop. For the sake of brevity, details of the current disclosure which are already explained in the description of FIG. 1, FIG. 2, FIG. 3, and FIG. 4 are not explained in detail in the description of FIG. 5.

The control system 108 may include a processor 504, an interface 506, and a memory 508 coupled to the processor 504. The processor 504 may be configured to fetch and execute computer readable instructions stored in the memory 508. In some implementations, the processor 504 may be implemented as microprocessors, microcomputers, microcontrollers, digital signal processors, central processing units, state machine, logic circuitries or any devices that manipulate signals based on operational instructions.

The interface 506 may facilitate multiple communications within wide variety of communication protocol(s) and network(s), including wired network(s) and/or wireless network(s). Further, the interface 506 may include a variety of software and hardware interfaces. In some implementations, the interface 506 may include, but not limited to, peripheral devices, such as a keyboard, a mouse, an external memory, and/or a printer. The interface 506 may facilitate multiple communications within wide variety of communication protocol(s) and network(s), as explained above. For example, the interface 506 may include ports for connecting the control system 108 to the output device 502.

In some implementations, the memory 508 may include any non-transitory computer-readable medium. In one example, the non-transitory computer-readable medium may be a volatile memory, such as static random access memory and a non-volatile memory, such as read-only memory, erasable programmable ROM, and flash memory.

The control system 108 may include modules 510 and data unit 512. The modules 510 may include hardware and/or software (routines, programs, objects, components, and data structures) which perform particular tasks or implement particular data types. In some implementations, the modules 510 may include a position determining module 514, a receiving module 516, a controller 518, and a learning module 520. The position determining module 514, the receiving module 516, the controller 518, and the learning module 520 may operate in conjunction with each other. The data unit 512 may be included in a repository for storing data processed, received, and generated by the modules 510. The data unit 512 may include a receiving data 522, a controller data 524, and a learning data 526.

The number of components of the control system 108 shown in FIG. 5 is provided for explanatory purposes. In practice, there may additional components, fewer components, different components, or differently arranged components than those shown in FIG. 5.

In an aspect, the position determining module 514 may be in communication with the position detection sensor 226, from the set of sensors 224. The position determining module 514 may receive details associated with the position and the orientation of the machine 100 relative to the worksite 102 or the ground surface 104 of the worksite 102. In an aspect, the details may include data received from the GPS and the IMU. Upon receiving the details, the position determining module 514 may determine a pose of the machine 100 based on the details. A pose of the machine 100 may be indicative of the position and the orientation of the machine 100, with respect to the coordinate system. In an aspect, details associated with the position determining module 514 may be stored in the receiving data 522.

Further, the receiving module 516 may receive values of the set of parameters associated with a profile of the first ground surface 312 between the work area 302 and the first dump location 304, a profile of the second ground surface 404 between the work area 302 and the second dump location 402, and operational characteristics of the machine 100.

In an aspect, the receiving module 516 may receive the values of the set of parameters associated with the profile of the first ground surface 312 and the profile of the second ground surface 404 from the set of sensors 224. The set of parameters associated with the profile of the first ground surface 312 and the profile of the second ground surface 404 may include, but is not limited to, a distance to be travelled by the machine 100 along the first ground surface 312 and the second ground surface 404 for dumping the material 308 at the first dump location 304 and the second dump location 402, respectively, a length of the flat surface 316 of the first ground surface 312, and an angle of inclination along the elevated surface 408 with respect to the inclined surface 406 of the second ground surface 404.

Further, the receiving module 516 may receive the values of the set of parameters associated with the operational characteristics of the machine 100 from the ECU 236 of the machine 100. The ECU 236 may have details associated with the odometer, the tachometer, the speedometer, and the fuel consumption of the machine 100. In an aspect, the receiving module 516 may receive the values of such parameters from historical data associated with the operation of the machine 100. The operational characteristics may vary for different type of machines 100 capable of pushing the material 308. In an aspect, the control system 108 may have data associated with the operational characteristics of different machines 100 operating at the worksite 102.

The set of parameters associated with the operational characteristics of the machine 100 may include, but is not limited to, a number of times the machine 100 may travel for moving the material 308 from the work area 302 to the first dump location 304, a number of times the machine 100 may travel for moving the material 308 from the work area 302 to the second dump location 402, a fuel consumption of the machine 100, and a speed of the machine 100 while travelling from the work area 302 to the first dump location 304 and the second dump location 402. In an aspect, details associated with the receiving module 516 may be stored in the receiving data 522.

In an aspect, the controller 518 may receive the pose of the machine 100 from the position determining module 514. Based on the values of the set of parameters associated with the profile of the first ground surface 312 and the profile of the second ground surface 404, the controller 518 may determine the profile of the first ground surface 312 and the second ground surface 404.

Referring to FIG. 3, FIG. 4, and FIG. 5, before moving the material 308 from the work area 302, the controller 518 may generate a first cost "$C_1$" and a second cost "$C_2$" for moving the material 308 to the first dump location 304 and the second dump location 402, respectively. Therefore, the controller 518 may estimate costs involved in moving the material 308 from the work area 302 to the first dump location 304 and the second dump location 402, before moving the material 308 to one of the first dump location 304 and the second dump location 402.

Referring to FIG. 3 and FIG. 5, the controller 518 may generate the first cost "$C_1$" by determining costs of dumping all batches of the material 308 to form the piles at the first dump location 304. The first cost "$C_1$" may be understood as sum of costs for forming the first pile "$X_1$", the second pile "$X_2$", the third pile "$X_3$" the fourth pile "$X_4$", the fifth pile "$X_5$", and the sixth pile "$X_6$" at the first dump location 304.

$$C_1 = C_{X1} + C_{X2} + C_{X3} + C_{X4} + C_{X5} + C_{X6} \qquad (1)$$

In an aspect, the controller 518 may generate the first cost "$C_1$" of moving the material 308 from the work area 302 to the first dump location 304, based on the profile of the first ground surface 312. In an aspect, the controller 518 may generate the first cost "$C_1$", based on a length "D" of the flat surface 316 of the first ground surface 312 and the number of times "$N_1$" the machine 100 may travel for moving the material 308 from the work area 302 to the first dump location 304. The controller 518 may generate the first cost "$C_1$" as:

$$C_1 = N_1 * (D/2) \qquad (2)$$

Referring to FIG. 4 and FIG. 5, the controller 518 may further generate the second cost "$C_2$" of moving the material 308 from the work area 302 to the second dump location 402 by determining costs of dumping all batches of the material 308 to form the elevated surface 408. The second cost "$C_2$" may be understood as sum of costs for forming the first pile "$Y_1$", the second pile "$Y_2$", the third pile "$Y_3$", the fourth pile "$Y_4$", the fifth pile "$Y_5$", and the sixth pile "$Y_6$" at the second dump location 402.

$$C_2 = C_{Y1} + C_{Y2} + C_{Y3} + C_{Y4} + C_{Y5} + C_{Y6} \qquad (3)$$

In an aspect, the controller 518 may generate the second cost "$C_2$" based on the profile of the second ground surface 404 and a compensating factor "K". The compensating factor "K" may be determined based on the operational characteristics of the machine 100 while moving the material 308 along the elevated surface 408.

The compensating factor "K" may be understood as a scalar factor reflecting an increase in cost when the machine 100 may dump the material 308 at the second dump location 402, in comparison to the cost incurred for dumping the material 308 at the first dump location 304. The compensating factor "K" may be indicative of increase in the cost due to change in factors affecting the dumping of the material 308 in the second dump location 402 in comparison to dumping of the material 308 in the first dump location 304. In an aspect, the travel conditions for the machine 100 on the inclined surface 314 of the first ground surface 312 and the inclined surface 406 of the second ground surface 404 may substantially be the same. Therefore, the difference is with respect to the travel on the flat surface 316 and the elevated surface 408 of the first ground surface 312 and the second ground surface 404, respectively. The compensating factor "K" may accommodate that difference while determining the second cost "$C_2$".

In an aspect, the controller 518 may generate the second cost "$C_2$" based on the compensating factor "K", the number of times "$N_2$" the machine 100 may travel for moving the material 308 from the work area 302 to the second dump location 402, and an area "$A_T$" of a triangle indicative of an area formed by the piles of the material 308 in the forward-stacking process before dumping of a batch of the material 308 to form the subsequent pile. In an aspect, the controller 518 may generate the second cost "$C_2$" as:

$$C_2 = (1+K) * \text{Sum}(A_T * (n^{0.5})/(N2^{0.5})) \qquad (4)$$

As would be gathered, the controller 518 may determine the second cost "$C_2$" based on a summation of values for a parabolic curve profile or a Gaussian curve profile of the elevated surface 408 of the second ground surface 404. In the abovementioned equation, "n" is an index of the number of times "$N_2$" the machine 100 travels from the work area 302 to the second dump location 402, and may vary between 1 to "$N_2$". In an aspect, in order to generate the second cost "$C_2$", the controller 518 may determine the compensating factor "K" and the area "$A_T$" of the triangle.

In an aspect, the controller 518 may determine the compensating factor "K" in comparison to the first cost "$C_1$". In one example, the machine 100 may have to travel on the elevated surface 408 at a slope of 25% for dumping the material 308 at the second dump location 402, in comparison to travel on the flat surface 316 of the first dump location 304. Based on the historical data, the controller 518 may determine that the machine 100 consumes 40% more fuel in case of travelling on the elevated surface 408 as compared to the flat surface 316. Further, time taken for maintenance of the machine 100 in such a case is 15% more than time taken for maintenance of the machine 100 travelling on the flat surface 316. Furthermore, an average speed of the machine 100 may decrease by 10% when pushing the material 308 on the elevated surface 408. Therefore, in the current example, the controller 518 may determine the compensating factor "K", based on the fuel consumption, the maintenance time, and the average speed of the machine 100 while travelling on the elevated surface 408.

Continuing with the present example, for travelling on the flat surface 316 for dumping the material 308, the machine 100 may incur a cost of 100 $ per 10000 ft. of travel, a cost of maintenance may be 10 $, time taken for disposing the material 308 may be 200 seconds, and 2 $ for slowing down by each percent for the distance on the flat surface 316 resulting into low productivity.

Therefore, the total cost for travelling of the machine 100 for a distance of 10000 feet on the flat surface 316 may be 110 $, i.e., 100 $+10 $+0 $. On the other hand, the total cost of travelling of the machine 100 for a distance of 10000 feet on the elevated surface 408 may be 171.5 $, i.e., 140 $+11.5 $+20 $.

Further, the machine 100 may travel back to the work area 302 after disposing the material 308. Based on the historical data, for reversing on the elevated surface 408, the controller 518 may determine that the machine 100 may consume 20% less fuel, the time taken for maintenance may decrease by 5%, and the average speed of the machine 100 may increase by 10%. Therefore, while the total cost for the reverse travel on the 10000 feet flat surface 316 may be 110 $, i.e., 100 $+10 $+0 $, the total cost for the reverse travel on the 10000 feet elevated surface 408 may be 69.5 $, i.e., 80$+9.5$−20 $.

The controller 518 may determine an average cost of travel of the machine 100 for 20000 feet on the flat surface 316 may be 220 $, i.e., 110 $+110 $. Further, the average cost of travel of the machine 100 for 20000 feet on the elevated surface 408 may be 241 $, i.e., 171.5 $+69.5 $. As would be gathered, although reversing on the flat surface 316 is expensive than reversing on the elevated surface 408, the average cost for the total travel on the flat surface 316 is still cheaper than the average cost for the travel on the elevated surface 408. In the current example, the controller 518 may determine the compensating factor "K" as 0.095, i.e., (241/220−1).

Further, with regard to the area "$A_T$" of the triangle, for dumping of each batch of the material 308 at the second dump location 402, the area "$A_T$" of the triangle may be different based on an angle of inclination for travel of the machine 100 on the elevated surface 408, a distance of the travel on the elevated surface 408 to dump the material 308, and a height of the pile standing on which the machine 100 may form the next pile of the material 308.

In FIG. 4, the dynamics of dumping of the material 308 at a specific point at the elevated surface 408 is shown. The three sides of the triangle are shown as "a", "b", and "c". Further, an angle formed between the side "a" and the side "b" is shown as "C". Similarly, an angle formed between the side "b" and the side "c" is shown as "A", and an angle formed between the side "c" and the side "a" is shown as "B".

In an aspect, the area "$A_T$" of the triangle may be determined based on the length of the side "a", the angle "A", the angle "B", and the angle "C". In an aspect, the controller 518 may determine the area "$A_T$" of the triangle as:

$$A_T = \tfrac{1}{2} * (a^2) * (\operatorname{Sin} B * \operatorname{Sin} C / \operatorname{Sin} A) \tag{5}$$

In an aspect, the control system 108 may receive the angle "C" from the operator. Further, a slope formed by the material 308 falling down from the work implement 202 in a natural manner may be 45 degrees due to gravitational force. Now, if a virtual vertical line from an edge of the side "a" may be drawn perpendicular to the side "b", the angle "B" may turn out to be formed of two angles, namely "$B_1$" and "$B_2$". The control system 108 determine the angle "$B_1$" and the angle "$B_2$" as:

$$B_1 = (90 \text{ Degrees} - \text{Angle } C) \tag{6}$$

$$B_2 = 45 \text{ Degrees} \tag{7}$$

Based on the angle "$B_1$" and the angle "$B_2$", the controller 518 may determine the angle "C" and the angle "A" as:

$$C = (90 \text{ Degrees} - \text{Angle } C) + 45 \text{ Degrees} \tag{8}$$

$$A = (180 \text{ Degrees} - \text{Angle } B - \text{Angle } C) \tag{9}$$

In an aspect, the area "$A_T$" of the triangle may be determined based on the number of times "$N_2$" the machine 100 may travel from the work area 302 to the second dump location 402 and a volume "$V_W$" of the material 308 which can be carried by the work implement 202 pushing the material 308. In an aspect, the controller 518 may determine the area "$A_T$" of the triangle as:

$$A_T = N_2 * V_W \tag{10}$$

Further, the controller 518 may determine the number of times "$N_2$" the machine 100 may travel from the work area 302 to the second dump location 402, based on a volume "$V_M$" of the material 308 to be dumped and the volume "$V_W$" of the work implement 202. In an aspect, the controller 518 may determine the number of time "$N_2$" as:

$$N_2 = V_M / V_W \tag{11}$$

Therefore, based on the aforementioned determinations, the controller 518 may determine the second cost "$C_2$" for moving the material 308 from the work area 302 to the second dump location 402.

Subsequently, based on the first cost "$C_1$" and the second cost "$C_2$", the controller 518 may send instructions to the machine 100 to move the material 308 to either of the first dump location 304 and the second dump location 402. In an aspect, the controller 518 may compare the first cost "$C_1$" with the second cost "$C_2$". Further, based on the comparison, the controller 518 may select one of the first dump location 304 and the second dump location 402 for dumping the material 308. Subsequently, based on the selection, the controller 518 may send the instructions to move the machine 100 towards one of the first dump location 304 and the second dump location 402.

In an aspect, when the controller 518 determines that the first cost "$C_1$" is less than the second cost "$C_2$", the controller 518 may send instructions to the machine 100 to move the material 308 to the first dump location 304. In an alternative aspect, when the controller 518 determines that the second cost "$C_2$" is less than the first cost "$C_1$", the controller 518 may send instructions to the machine 100 to move the material 308 to the second dump location 402. In an aspect, details associated with the controller 518 may be stored in the controller data 524.

Further, the learning module 520 may store details associated with the set of parameters, the generation of the first cost "$C_1$" and the second cost "$C_2$", and historical data associated with the operational characteristics of the machine 100 while moving over the first ground surface 312 and the second ground surface 404.

In an aspect, the controller 518 may retrieve the details stored by the learning module 520 for generation of the first cost "$C_1$" and the second cost "$C_2$" for subsequent dumping of the material 308 from the work area 302 to one of the first dump location 304 and the second dump location 402.

For example, in case the machine 100 got stuck while disposing a batch of the material 308, the control system 108 may tag the set of parameters or the instructions sent to the machine 100 for the disposal of the batch as "Not Suitable". For disposal of subsequent batch of the material 308, the control system 108 may revise the instructions of operating the machine 100 based on the previous experience in order to eliminate the possibility of being stuck again. Therefore, the control system 108 may learn from previous cycles of dumping the material 308, and perform the subsequent dumping of the material 308 based on the learning. In an aspect, details associated with the learning module 520 may be stored in the learning data 526.

In one aspect, the controller 518 may generate a report indicative of selection of one of the first cost "$C_1$" and the second cost "$C_2$" for dumping the material 308. The report may include, but is not limited to, the values of the set of parameters, the compensating factor "K", the first cost "$C_1$", the second cost "$C_2$", and the selection of one of the first cost and the second cost. The controller 518 may provide the report and any other information associated with the control system 108 to the user through the output device 502.

INDUSTRIAL APPLICABILITY

Figure 6:
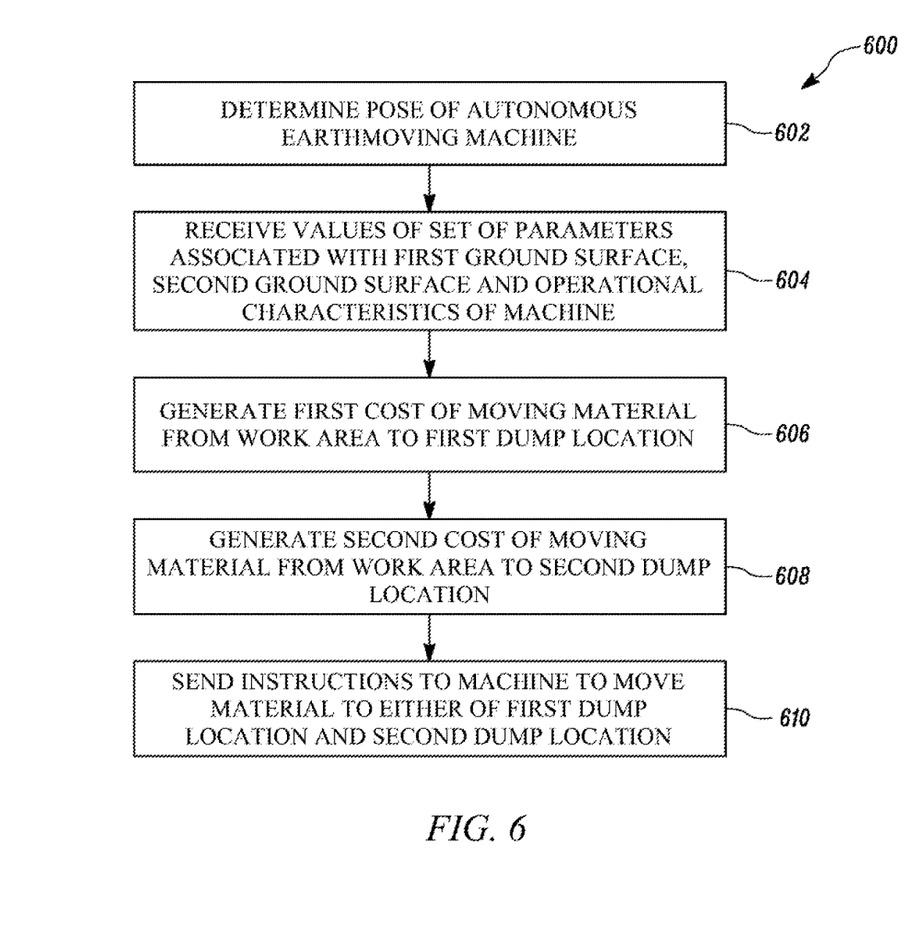
FIG. 6 illustrates a flow chart of a method of operating the autonomous earthmoving machine to move the material from the work area to either of the first dump location and the second dump location, according to an aspect of the current disclosure.

The current disclosure relates to the control system 108, the machine 100 having the control system 108, and a method 600 for operating the machine 100 to move the material 308 from the work area 302 to either of the first dump location 304 and the second dump location 402 based on the cost, according to an aspect of the current disclosure. The control system 108 may receive the values of the set of parameters associated with the profiles of the first ground surface 312 and the second ground surface 404, and the operational characteristics of the machine 100 to determine the first cost "$C_1$" and the second cost "$C_2$" of movement of the material 308. The current disclosure is applicable for selection of one of many approaches for dumping the material 308 provided the approaches relate to different profiles of the ground surface travelled by the machine 100 for dumping the material 308, without departing from the scope of the present disclosure.

FIG. 6 illustrates the method 600 for operating the machine 100 to move the material 308 from the work area 302 to one of the first dump location 304 and the second dump location 402 based on the cost, according to an aspect of the present disclosure. For the sake of brevity, constructional and operational features of the current disclosure which are already explained in detail in the description of FIG. 1, FIG. 2, FIG. 3, FIG. 4, and FIG. 5 are not explained in detail in the description of FIG. 6.

At block 602, the method 600 commences with determining the pose of the machine 100. In an aspect, the pose of the machine 100 may be determined based on the details received from the position detection sensor 226 of the machine 100.

At block 604, the method 600 includes receiving the values of the set of parameters from the set of sensors 224. The set of parameters may be associated with the profile of the first ground surface 312 between the work area 302 and the first dump location 304, the profile of the second ground surface 404 between the work area 302 and the second dump location 402, and the operational characteristics of the machine 100.

In an aspect, the set of parameters may include at least one of the angle of inclination along the elevated surface 408 with respect to the inclined surface 406 of the second ground surface 404, the distance to be travelled by the machine 100 along the first ground surface 312 and the second ground surface 404, the length of the flat surface 316 of the first ground surface 312, the number of times the machine 100 travels for moving the material 308 from the work area 302 to the first dump location 304, the number of times the machine 100 travels for moving the material 308 from the work area 302 to the second dump location 402, the fuel consumption of the machine 100, and the speed of the machine 100 while travelling from the work area 302 to the first dump location 304 and the second dump location 402.

At block 606, the method 600 includes generating the first cost "$C_1$" of moving the material 308 from the work area 302 to the first dump location 304. In an aspect, the first cost "$C_1$" may be generated based on the profile of the first ground surface 312. In an aspect, the first cost "$C_1$" may be generated based on the number of times the machine 100 travels for moving the material 308 from the work area 302 to the first dump location 304.

At block 608, the method 600 includes generating the second cost "$C_2$" of moving the material 308 from the work area 302 to the second dump location 402. In an aspect, the second cost "$C_2$" may be generated based on the profile of the second ground surface 404 and the compensating factor "K". In an aspect, the second cost "$C_2$" may be generated based on the number of times the machine 100 travels for moving the material 308 from the work area 302 to the second dump location 402.

At block 610, the method 600 includes sending instructions to the machine 100 to move the material 308 from the work area 302 to either of the first dump location 304 and the second dump location 402, based on the first cost "$C_1$" and the second cost "$C_2$". In an aspect, the first cost "$C_1$" and the second cost "$C_2$" may be compared. Further, based on the comparison, one of the first dump location 304 and the second dump location 402 for dumping the material 308 from the work area 302 may be selected. Accordingly, instructions may be sent to the machine 100 to move the machine 100 towards one of the first dump location 304 and the second dump location 402, based on the selection.

In an aspect, the method 600 may include storing the details associated with the set of parameters, the generation of the first cost "$C_1$" and the second cost "$C_1$", and the historical data associated with the operational characteristics of the machine 100 moving the material 308 over the first ground surface 312 and the second ground surface 404. Further, the stored details may be retrieved for generation of the first cost "$C_1$" and the second cost "$C_2$" for subsequent dumping of the material 308 from the work area 302 to one of the first dump location 304 and the second dump location 402.

The machine 100, the control system 108, and the method 600 of the current disclosure offer a comprehensive approach for moving the material 308 from the work area 302 to one of the first dump location 304 and the second dump location 402. The control system 108 proposes an objective approach to select one of the back-stacking and the forward-stacking approach for disposal of the material 308 at the worksite 102.

The control system 108 determines the first cost "$C_1$" and the second cost "$C_2$" based on an exhaustive list of parameters that may affect the performance of the machine 100. Therefore, the approach opted for selection of the dumping location is accurate. Further, since the control system 108 learns from the previous operations and improves the subsequent operations accordingly, the overall performance of the control system 108 and therefore, of the machine 100 keeps on improving. This will also ensure that the productivity of the machine 100 is optimum with minimum distance travelled. Moreover, since the machine 100 is being operated in an optimum condition, the maintenance and corresponding cost may be significantly reduced. Therefore, the current disclosure offers the control system 108 and the method 600 for disposal of the material 308 that are comprehensive, simple, effective, accurate, economical, and flexible.

What is claimed is:

1. A control system for operating an autonomous earthmoving machine to move material from a work area to a first dump location or a second dump location, the control system comprising:
    a memory; and
    a controller configured to:
        generate a first cost of moving the material from the work area to the first dump location based at least in part on a profile of a first ground surface between the work area and the first dump location,
            wherein the first ground surface comprises an inclined surface and a flat surface extending from the inclined surface;
        generate a second cost of moving the material from the work area to the second dump location based at least in part on a profile of a second ground surface, between the work area and the second dump location, and a compensating factor,
            wherein the second ground surface comprises an inclined surface and an elevated surface extending from the inclined surface, and
            wherein the compensating factor is determined based on operational characteristics of the autonomous earthmoving machine;
        determine that the first cost is less than the second cost;
        select the first dump location, from the first dump location and the second dump location, for dumping the material from the work area based on determining that the first cost is less than the second cost; and
        send instructions to the autonomous earthmoving machine to move the material from the work area to the first dump location based on selecting the first dump location.

2. The control system of claim 1, wherein a set of parameters associated with the profile of the first ground surface and the profile of the second ground surface comprises at least one of a distance to be travelled by the autonomous earthmoving machine along the first ground surface or the second ground surface, a length of the flat surface of the first ground surface, or an angle of inclination along the elevated surface with respect to the inclined surface of the second ground surface.

3. The control system of claim 1, wherein the operational characteristics of the autonomous earthmoving machine comprise a number of times the autonomous earthmoving machine travels for moving the material from the work area to the first dump location, a number of times the autonomous earthmoving machine travels for moving the material from the work area to the second dump location, a fuel consumption of the autonomous earthmoving machine, and a speed of the autonomous earthmoving machine while travelling from the work area to the first dump location and the second dump location.

4. The control system of claim 1, wherein the first cost is generated further based on a number of times the autonomous earthmoving machine travels for moving the material from the work area to the first dump location.

5. The control system of claim 1, wherein values of a set of parameters, associated with the profile of the first ground surface and the profile of the second ground surface, are received from a set of sensors.

6. The control system of claim 1, further comprising:
    a learning module in communication with the controller, the learning module being configured to store details associated with:
        a set of parameters associated with the profile of the first ground surface, the profile of the second ground surface between the work area and the second dump location, and the operational characteristics of the autonomous earthmoving machine,
    and
        historical data associated with the operational characteristics of the autonomous earthmoving machine moving the material over the first ground surface and the second ground surface.

7. The control system of claim 6, wherein the controller is further configured to:
    retrieve the stored details for generation of the first cost and the second cost.

8. The control system of claim 1, wherein the compensating factor is determined while moving the material along the elevated surface.

9. A method of operating an autonomous earthmoving machine to move material from a work area to either of a first dump location and a second dump location based on cost, the method comprising:
    generating a first cost of moving the material from the work area to the first dump location based at least in part on a profile of the first ground surface between the work area and the first dump location,
        wherein the first ground surface comprises an inclined surface and a flat surface extending from the inclined surface;
    generating a second cost of moving the material from the work area to the second dump location based at least in part on a profile of a second ground surface, between the work area and the second dump location, and a compensating factor, wherein the second ground surface comprises an inclined surface and an elevated surface extending from the inclined surface, and wherein the compensating factor is determined based on operational characteristics of the autonomous earthmoving machine;

determining that the first cost is less than the second cost;

selecting the first dump location, from the first dump location and the second dump location, for dumping the material from the work area based on determining that the first cost is less than the second cost; and sending instructions to the autonomous earthmoving machine to move the material from the work area to the first dump location based on selecting the first dump location.

10. The method of claim 9, further comprising:

storing details associated with
- a set of parameters associated with the profile of the first ground surface, the profile of the second ground surface between the work area and the second dump location, and the operational characteristics of the autonomous earthmoving machine, and
- historical data associated with the autonomous earthmoving machine moving the material over the first ground surface and the second ground surface; and retrieving the stored details for generation of the first cost and the second cost.

11. The method of claim 10, wherein the set of parameters comprises at least one of an angle of inclination along the elevated surface with respect to the inclined surface of the second ground surface, a distance to be travelled by the autonomous earthmoving machine along the first ground surface and the second ground surface, a length of the flat surface of the first ground surface, a number of times the autonomous earthmoving machine travels for moving the material from the work area to the first dump location, a number of times the autonomous earthmoving machine travels for moving the material from the work area to the second dump location, a fuel consumption of the autonomous earthmoving machine, and a speed of the autonomous earthmoving machine while travelling from the work area to the first dump location and the second dump location.

12. The method of claim 9, wherein the first cost is generated further based on a number of times the autonomous earthmoving machine travels for moving the material from the work area to the first dump location.

13. The method of claim 9, further comprising:

determining the compensating factor while moving the material along the elevated surface.

14. An autonomous earthmoving machine comprising:

a ground engaging work implement for engaging ground surfaces of a work area; and a control system for operating the autonomous earthmoving machine to move material, by using the ground engaging work implement, from the work area to either a first dump location or a second dump location, the control system being configured to:

generate a first cost of moving the material from the work area to the first dump locational based at least in part on a profile of a first ground surface between the work area and the first dump location, wherein the first ground surface comprises an inclined surface and a flat surface extending from the inclined surface;

generate a second cost of moving the material from the work area to the second dump location based at least in part on a profile of a second ground surface between the work area and the second dump location, and a compensating factor, wherein the second ground surface comprises an inclined surface and an elevated surface extending from the inclined surface, and wherein the compensating factor is determined based on operational characteristics of the autonomous earthmoving machine;

determine that the second cost is less than the first cost;

select the second dump location, from the first dump location and the second dump location, for dumping the material from the work area based on determining that the second cost is less than the first cost; and control the autonomous earthmoving machine to move the material from the work area to the second dump location, based on selecting the second dump location.

15. The autonomous earthmoving machine of claim 14, wherein a set of parameters associated with the profile of the first ground surface and the profile of the second ground surface comprises at least one of a distance to be travelled by the autonomous earthmoving machine along the first ground surface or the second ground surface, a length of the flat surface of the first ground surface, or an angle of inclination along the elevated surface with respect to the inclined surface of the second ground surface.

16. The autonomous earthmoving machine of claim 14, wherein the operational characteristics of the autonomous earthmoving machine comprise a number of times the autonomous earthmoving machine travels for moving the material from the work area to the first dump location, a number of times the autonomous earthmoving machine travels for moving the material from the work area to the second dump location, a fuel consumption of the autonomous earthmoving machine, and a speed of the autonomous earthmoving machine while travelling from the work area to the first dump location and the second dump location.

17. The autonomous earthmoving machine of claim 14, wherein the control system is further configured to:

receive values of a set of parameters, associated with the profile of the first ground surface and the profile of the second ground surface, from a set of sensors.

18. The autonomous earthmoving machine of claim 17, wherein the set of sensors includes at least one of a position detection sensor, an engine speed sensor, a torque converter speed sensor, a terrain detection sensor, or an implement load sensor.

19. The autonomous earthmoving machine of claim 14, wherein the control system is further configured to:

store details associated with:
- a set of parameters associated with the profile of the first ground surface, the profile of the second ground surface between the work area and the second dump location, and the operational characteristics of the autonomous earthmoving machine, and
- historical data associated with the autonomous earthmoving machine moving the material over the first ground surface and the second ground surface.

20. The autonomous earthmoving machine of claim 19, wherein the control system is further configured to:

retrieve the stored details for generation of the first cost and the second cost.

* * * * *